United States Patent Office
3,560,286
Patented Feb. 2, 1971

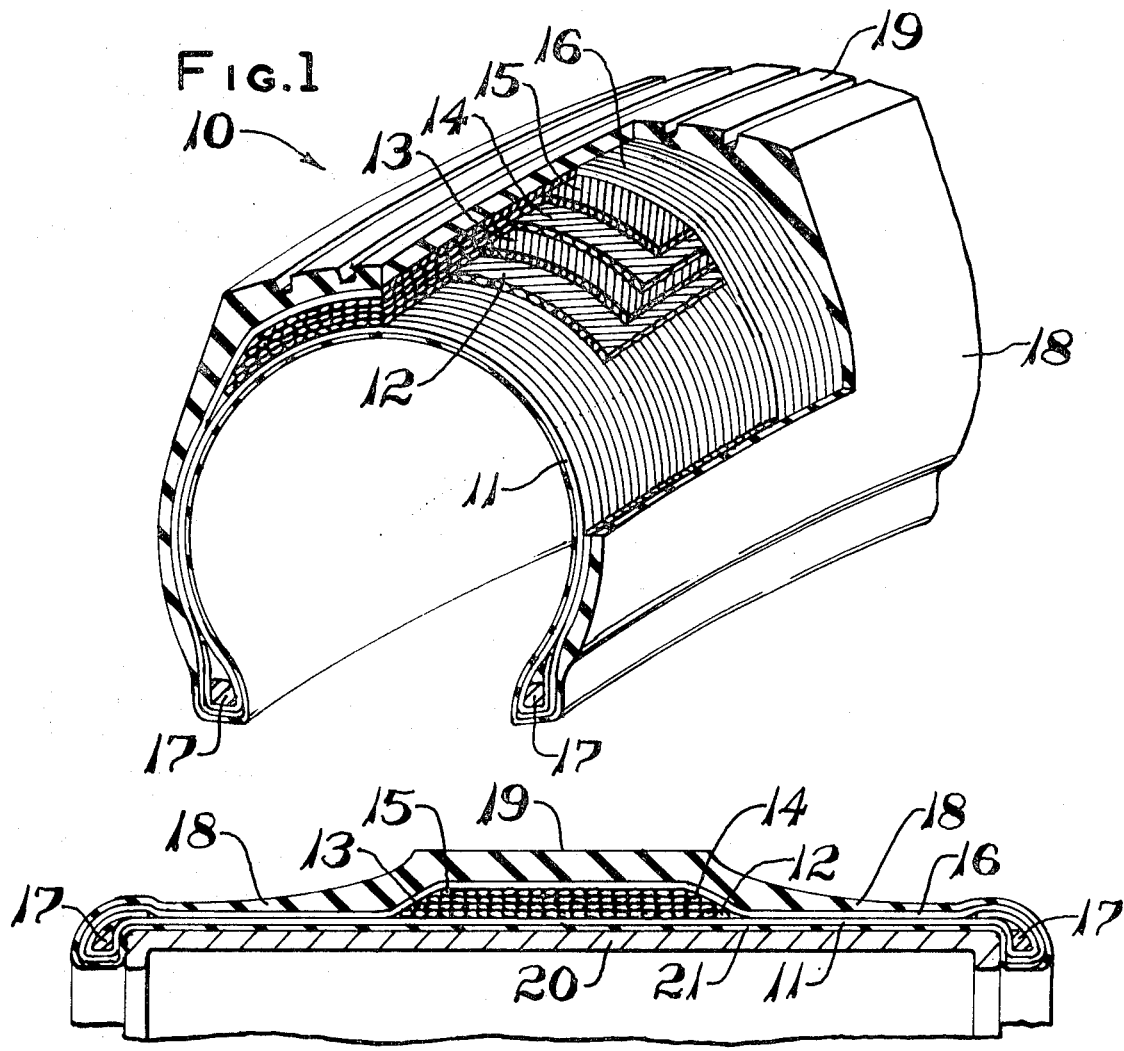
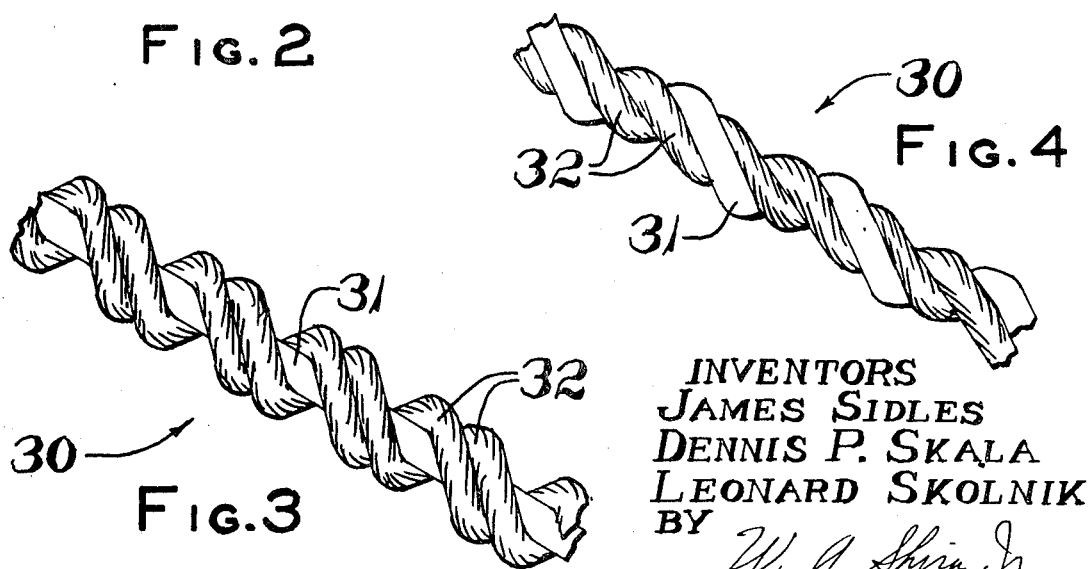

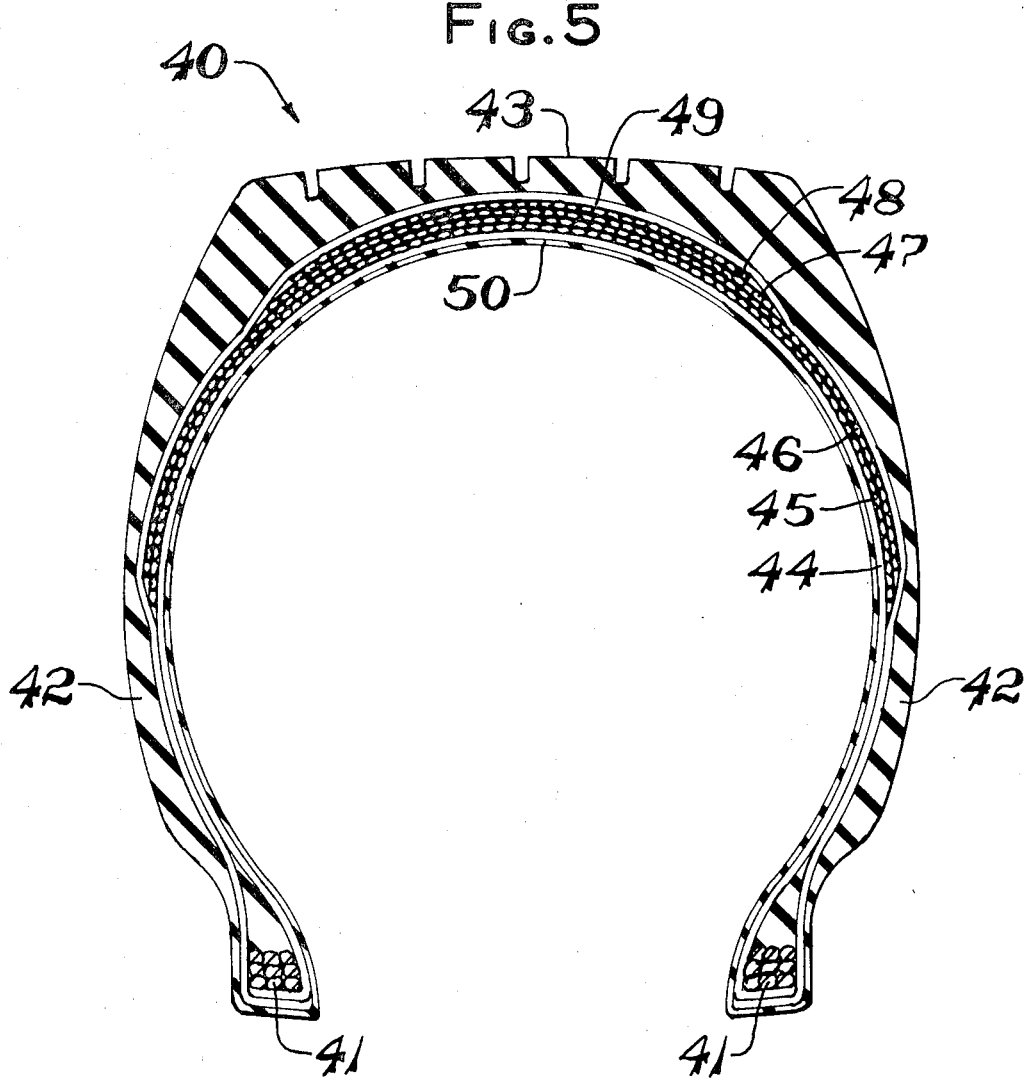

3,560,286
METHOD OF MAKING A RADIAL TIRE IN FLAT-BAND FORM
James Sidles, West Richfield, Dennis P. Skala, Akron, and Leonard Skolnik, Cleveland, Ohio, assignors to The B. F. Goodrich Company, New York, N.Y., a corporation of New York
Filed Mar. 15, 1968, Ser. No. 713,373
Int. Cl. B29h 17/26
U.S. Cl. 156—132                                    5 Claims

ABSTRACT OF THE DISCLOSURE

A pneumatic tire comprising a carcass of radially disposed plies of inextensible reinforcing cords, surmounted by a restricting band of circumferentially disposed plies of reinforcing cords of predetermined stretchability intermediate the radially disposed plies, and the method of making such a tire in flat-band form on a conventional buildding drum.

BACKGROUND OF THE INVENTION

Pneumatic tires of the type having radially-oriented carcass reinforcing cords require a circumferential carcass restricting and tread reinforcing belt disposed over the crown region of the carcass. The purpose of the belt is to restrict the circumferential expansion of the carcass in the crown region and, additionally, to provide structural reinforcement for the tire tread. One problem encountered in tires of this type is separation of the reinforcing belt from the radial carcass plies. This phenomena usually occurs near the axial edges of the belt. In addition to this difficulty, the manufacture of radial cord tires is at present, difficult and thus costly because either an expansible building drum is required or the carcass must be removed from the non-expansible drum and expanded or "lifted" to full toroidal configuration before the tread reinforcing and carcass restricting belt are applied. This procedure is necessary because the present constructions required to provide the necessary inextensibility of the belt do not permit sufficient pantographing of the "bias angle" cords therein to allow expansion of the completed tire from the building drum diameter to the full toroidal configuration.

SUMMARY OF THE INVENTION

The present invention provides a solution to the above problems by utilizing a unique carcass restricting and tread reinforcing belt with reinforcing cords of pre-determined and limited stretchability, thereby enabling the belt to be applied to the tire in flat-band form on a conventional building drum and thereafter expanded to the diameter required in the completed tire after which further expansion is prevented. Moreover, the belt plies of the present invention are disposed intermediate the carcass plies, thereby providing a structure having a greatly reduced tendency for the belt to separate from the carcass plies at the axial edges of the belt. Furthermore, undesirable "side-tracking" of the tire in use is eliminated by having the radially outer ply-cords disposed at substantially right angles to the direction of rotation. This is in contrast to conventional radial cord tires in which the bias angle of the cords in the radially outermost belt ply, are immediately adjacent the base of tread, and tend to produce a lateral or side-tracking force when the tire is running under normal load.

As mentioned above, radial cord tires could not previously be built completely in flat-band form and thereafter expanded to toroidal shape in view of the inability of the reinforcing belt to extend to the requisite larger diameter. This has heretofore prevented commercial production of radial tires with the belt between the radial plies.

The present invention not only results in an improved and strengthened carcass but also provides an improved method of tire building by which the uncured tire may now be completely assembled on a conventional non-expansible building drum. This is made possible by employing for the carcass restricting belt cords which are initially stretchable but after a predetermined elongation abruptly change to become substantially inextensible and thereafter retain the tire carcass in desired size and shape.

BRIEF DESCRIPTION OF THE DRAWINGS

FIG. 1 is a perspective view of a portion of the tire with the tread and sidewall broken away to expose the reinforcing cords;

FIG. 2 is a portion of a transverse sectional view taken axially through a tire building drum showing the tire of FIG. 1 before expansion and vulcanization;

FIG. 3 is an enlarged perspective view of the reinforcing cord in the unstretched state as used in the tire of FIG. 1; and FIG. 4 is a view similar to FIG. 3 illustrating the cord of FIG. 3 in the extended state.

FIG. 5 is a partial section view of another embodiment of the tire.

DETAILED DESCRIPTION

Referring to FIG. 1, the tire 10 illustrating the presently preferred form of the invention, is shown in the vulcanized state. The carcass is formed of at least one initial ply 11 of elastomer having axially extending reinforcing cords of inextensible textile material terminating in spaced beads 17. The radially inner carcass ply 11 has a portion of the crown thereof surmounted by a circumferential belt comprising at least two but preferably four plies 12, 13, 14 and 15 of elastomer coated cords, initially stretchable but subsequently inextensible after vulcanization, disposed in superposed relationship and extending axially the width of the crown portion of the tire. At least one carcass ply 16 having axially extending inextensible reinforcing cords is disposed over the belt layers 12, 13, 14 and 15 in superposed relationship such that the ply 16 extends continuously between the beads 17. The crown portion of the outer carcass ply layer of the tire is surmounted by a tread 19 while the sides of the carcass are covered by sidewalls 18 of elastomeric material.

The tire, as illustrated in FIG. 1 is therefore of radial carcass construction having a reinforcing and restricting belt radially intermediate the carcass plies of radial cords. The restriction is provided by having the reinforcing cords in the belt plies 12, 13, 14 and 15 disposed in low bias angles to the plane of rotation of the tire with the cords making equal but opposite angles in adjacent superposed layers. The tire, as illustrated in FIG. 1, has four belt plies; however, if required for strength, additional layers of belt plies may be utilized. Furthermore, additional layers of carcass plies 11 and 16 may be added to meet the tire design requirements.

The reinforcing cords in FIG. 2 in the belt plies 12, 13, 14 and 15 are of material having a predetermined limited stretchability. In the preferred form of the invention the cords are capable of stretching up to a maximum of 70% of their initial length, whereupon the cords undergo an abrupt change to a substantially higher tensile modulus with the cords remaining thereafter substantially inextensible.

Referring now to FIGS. 3 and 4, the reinforcing cord 30 which is used in the belt plies 12, 13, 14 and 15 is shown in greater detail. The cord comprises a core 31 of vulcanized elastic material covered with yarns 32 of substantially inextensible textile material wrapped helically around the core in longitudinally spaced coiled arrangement. The cord as shown in FIG. 3 is in the relaxed or unstretched configuration. FIG. 4 illustrates the cord 30 as it appears in the stretched state, wherein the cord has undergone the transition to the higher tensile modulus. In the stretched state the textile yarns 32 are stretched to a nearly linear configuration with the core 31 wrapped helically around the yarns 32 in a longitudinally closed coil arrangement. Further details of the stretchable cords may be found in our Pat. No. 3,455,100, issued July 15, 1969, entitled Reinforcement for Elastomeric Articles. However, the invention is not limited to the particular stretchable cords disclosed herein or in the above-referenced patent. The tire may be made with any suitable cord capable of stretching at least 30% but generally not greater than 70% of its initial length and becoming thereafter inextensible, which cord upon having the tension released will return to substantially its initial length.

Referring now to FIG. 5, another embodiment of the invention is shown with a portion of the carcass reinforcing belt extending into the sidewall region of the tire. The tire 40 of FIG. 5 has a carcass terminating in a pair of spaced beads 41, sidewalls 42 with a surmounting tread 43. The carcass of the tire is formed of a first ply 44 of elastomer covered inextensible reinforcing cords extending axially of the tire continuously from bead to bead. Where tubeless inflation is desired, an air-impervious liner 50 may be incorporated radially inwardly of the carcass ply 50. Superposed radially outward of the ply 44 in the crown region of the tire is a carcass restricting and reinforcing belt of initially stretchable but subsequently inextensible cords covered with elastomeric material which cords are similar to the cord 30 of FIGS. 3 and 4. The belt of stretchable cords comprises four plies 45, 46, 47 and 48 with the stretchable cords in adjacent plies making equal but opposite acute angles with the rotational midplane of the tire.

In the embodiment of FIG. 5, the pair of radially inner belt plies 45 and 46 extend into the sidewall regions to the axially widest region of the tire, thereby providing reinforcement and protection of the radially inner carcass ply 44. The radially outer pair of belt plies 47 and 48 extend axially only the width of the tread to provide carcass restriction and reinforcement of the crown region of the tire. A radially outer carcass ply 49 of elastomer covered inextensible textile cords covers the belt plies of stretchable cords with the cords in the carcass ply 49 extending axially continuously and interconnecting the beads 17. As shown in FIG. 5, the two pairs of belt plies 45, 46, 47 and 48 have their axial edges tapered by stepping to provide smoother contouring of the outer carcass ply 49. In the embodiment of FIG. 5, two pairs of plies of stretchable cord having been used; however, additional pairs of belt plies may be incorporated to provide desired increases in strength for tires carrying heavier loads.

The tire of FIG. 5 is completely fabricated for curing in a single-phase operation on a conventional building drum in the same manner as described below for the embodiment of FIG. 1 and FIG. 2. The tire is completely assembled on the conventional building drum and then expanded to full toroidal configuration and vulcanized in the expanded state.

Referring now to FIG. 2, the uncured tire is shown as it is assembled on a conventional tire building drum 20 having the usual means for collapsing the drum to permit removal of the uncured tire therefrom. The tire is fabricated by placing the radially inner carcass ply 11 of uncured cord-reinforced elastomeric material circumferentially over the drum with the inextensible reinforcing cords therein disposed substantially axially parallel to the drum axis and extending over the ends of the drum. If desired, a liner layer 21 of air-impervious elastomer may be applied to the drum prior to application of the carcass ply 11 for permitting tubeless inflation of the tire.

The initial ply 12 of the pair of plies for the carcass restricting and reinforcing belt is applied circumferentially over the carcass ply 11 in superposed arrangement and spaced axially centered intermediate the ends of the drum. The subsequent plies 13, 14 and 15 of the belt plies, are applied circumferentially over the initial layer 12 and centered axially thereon. The belt plies 12, 13, 14 and 15 have stretchable cords therein which are initially relaxed and disposed at a bias angle to the drum axis with the cords in radially adjacent layers making equal but opposite angles with the drum axis. If desired, each of the belt plies may extend axially a slightly greater width than each subsequent layer in order to provide stepped edges on the belt to facilitate subsequent application of subsequent layers of carcass ply material. In the tire illustrated in FIG. 2, four plies 12, 13, 14 and 15 are utilized. However, if greater strength is required, additional pairs of belt plies may be applied at this time before proceeding further with the assembly of the tire. Alternatively, if lesser strength is required only two layers of belt plies may be used.

Upon completion of the application of the carcass-restricting belt plies having stretchable cords, the bead cores 17, with attendant flipper strips, are then applied to the ends of the drum. A subsequent layer or layers of carcass stock 16 having inextensible cords are applied over the previous plies in circumferentially superposed arrangement with the axially disposed cords extending over the ends of the drum. The layers of carcass plies are then turned alternately thereover the beads. Uncured elastomeric material is then applied circumferentially over the carcass to form the sidewalls 18 and tread 19 of the tire. The uncured tire is then removed from the building drum 20, expanded to the full toroidal configuration and vulcanized in a mold to form a completed tire.

The extensible nature of cords 30, in the belt plies, enables a radial tire to be completely assembled in a flat band because the cords 30 in the belt plies elongate with only a minor pantographing action when the tire is expanded to its full configuration. The elongation characteristics of the cords 30 are so chosen that the cords have undergone transition to their higher tensile modulus state, which is substantially inextensible preventing further expansion of the tire when the latter has achieved its final cured configuration.

In the cured state of the tire, the stretchable cords are elongated to their fullest extent such that the textile yarns are substantially linear with the rubber core wrapped tightly therearound. The mass of cured elastomer in the carcass tread and sidewalls of the cured tire is sufficiently stiff in compression to prevent the cords in the carcass belt from contracting to a state below their modulus transition point. The stretchable cords thus remain fully extended in the cured tire.

Modifications and adaptations of the present invention may be made by those having ordinary skill in the art and the invention is limited only by the spirit and scope of the appended claims.

We claim:
1. The method of making a tire having a carcass with substantially radially extending reinforcing cords and a circumferential belt of initially stretchable reinforcing cords with the cords in adjacent plies extending at opposite acute angles to the axial midplane of the tire comprising:
(a) providing ply stock of reinforcing cords of inextensible textile material in closely spaced parallel extending relationship and coated with uncured elastomeric material;
(b) providing ply stock comprising sheet formed of a plurality of cords of elastically stretchable material having initially a low tensile modulus and upon elongation a predetermined amount in the range 30–70% of the initial length abruptly change to a sufficiently higher tensile modulus that the cords thereafter are substantially inextensible, with the cords being disposed in closely spaced parallel relationship extending at an acute angle to the length of the stock and coated with uncured elastomer;

(c) applying one layer of the first-mentioned ply stock to a conventional tire building drum with the cords therein disposed axially of the drum;

(d) applying at least two plies of the second-mentioned ply stock upon the first layer of ply stock in an annular superposed arrangement centered between the ends of the drum with the cords in successive plies alternating in direction to form the said circumferential belt;

(e) placing a bead core with attached flipper strip adjacent each edge of the first-mentioned layer of ply stock and turning the latter axially thereover to form axially spaced beads;

(f) applying at least one additional layer of the first-mentioned ply stock with the ends extending axially of the drum over the first layer and belt;

(g) turning the edges of the last-mentioned layer about the beads axially of the drum;

(h) applying uncured elastomer in annular superposed arrangement over the said layers to provide sidewalls and a tread in the completed tire;

(i) removing the uncured tire from the building drum in substantial cylindrical configuration;

(j) shaping the tire to a substantially full toroidal configuration by expanding the tread region and reducing the axial separation of the beads; and (k) vulcanizing said tire in a mold provided with a tread forming pattern.

2. The method as defined in claim 1 further comprising applying a liner layer of air-impervious elastomer to the building drum prior to application of the first of said layers of reinforcing cords.

3. The method as defined in claim 1, wherein each successive radially outer belt ply of stretchable cords is axially narrower in width than the adjacent radially inner belt ply to provide an axially tapering stepped edge for the belt.

4. The method as defined in claim 1, wherein said belt has four plies of stretchable cords with the inner pair of belt plies extending into the sidewall region of the tire to the axially widest portion of the tire and the radially outer pair of belt plies extending axially the width of the tread.

5. The method defined in claim 1, wherein the said stretchable cords each comprise:

(a) a core of initially vulcanized elastomeric material and (b) at least one yarn or inextensible textile material wrapped helically around the core with longitudinally spaced convolutions when the stretchable cords are in the relaxed condition.

References Cited

UNITED STATES PATENTS

| 2,884,044 | 4/1959 | Hulswit, Jr. et al. | 156—123 |
| 3,373,066 | 3/1968 | Hindin | 156—128 |
| 3,409,492 | 11/1968 | Yoe | 156—132 |

FOREIGN PATENTS

| 1,001,585 | 2/1952 | France | 156—128 |

BENJAMIN A. BORCHELT, Primary Examiner

S. C. BENTLEY, Assistant Examiner

U.S. Cl. X.R.

156—133